United States Patent [19]

Besemann

[11] Patent Number: 4,715,551
[45] Date of Patent: Dec. 29, 1987

[54] SELF-LOCKING DEVICE FOR TRANSMITTING TORQUE TO BOBBIN CORES

[75] Inventor: Alfred Besemann, Hamburg, Fed. Rep. of Germany

[73] Assignee: E. C. H. Will (GmbH & Co.), Hamburg, Fed. Rep. of Germany

[21] Appl. No.: 40,867

[22] Filed: Apr. 21, 1987

[30] Foreign Application Priority Data

Apr. 26, 1986 [DE] Fed. Rep. of Germany ....... 3614286

[51] Int. Cl.⁴ ...................... B65H 54/54; B65H 75/24
[52] U.S. Cl. .................................... 242/46.4; 242/72.1
[58] Field of Search ..................... 242/46.4, 46.2, 46.3, 242/72 R, 72.1, 68.2; 279/2 R, 1 F

[56] References Cited

U.S. PATENT DOCUMENTS

| | | | |
|---|---|---|---|
| 2,392,612 | 1/1946 | Olson | 242/72.1 |
| 2,483,143 | 9/1949 | McConnell et al. | 242/72.1 |
| 2,561,745 | 7/1951 | Lerch | 242/72 R |
| 3,001,736 | 9/1961 | Schultz et al. | 242/72 R |
| 3,006,565 | 10/1961 | Pelletier | 242/46.4 |
| 3,201,058 | 8/1965 | Waldherr et al. | 242/72.1 |
| 3,792,868 | 2/1974 | Flagg | 242/72 R X |
| 3,910,520 | 10/1975 | Mosser | 242/72 R X |
| 4,339,094 | 7/1982 | Thievessen et al. | 242/72 R X |
| 4,516,786 | 5/1985 | Lund | 242/72 R X |

Primary Examiner—Stanley N. Gilreath
Attorney, Agent, or Firm—Peter K. Kontler

[57] ABSTRACT

A self-locking chuck which can clamp the hollow core of a bobbin to a rotor has two nuts which mate with externally threaded sections of the rotor and have threads inclined in opposite directions or threads of different pitch so that they move axially toward or away from each other in response to joint rotation relative to the rotor or vice versa. The nuts are surrounded by two or more axially parallel torque transmitting segments whose external surfaces are movable into torque-transmitting engagement with the internal surface of a core in response to joint rotation of the nuts relative to the rotor. To this end, the inner sides of the segments are provided with a first set of cam faces and the outer sides of the nuts are provided with a second set of cam faces which cooperate with the cam faces of the segments to move the segments radially outwardly in response to joint rotation of the nuts relative to the rotor. Such rotation can be brought about by the internal surface of the core through the medium of the segments.

11 Claims, 4 Drawing Figures

SELF-LOCKING DEVICE FOR TRANSMITTING TORQUE TO BOBBIN CORES

BACKGROUND OF THE INVENTION

The invention relates to self-locking devices for transmitting torque from a rotor to a tubular component or vice versa, especially for transmitting torque from a rotor to the core of a bobbin or the like. More particularly, the invention relates to improvements in so-called self-locking clamping chucks which can be inserted into tubular bodies prior to radial expansion to thereby ensure that the tubular body is compelled to rotate with the part or parts which drive the chuck.

The term "self-locking" is intended to denote clamping chucks and analogous torque transmitting devices of the type wherein one or more torque transmitting members can be arranged to move radially outwardly from the axis of a rotor in order to engage the internal surface of a tubular component (such as the core of a bobbin) if the tubular component is rotated while in contact with one or more torque transmitting members and while the rotor which is used to drive the torque transmitting members is braked.

German Auslegeschrift No. 1 574 438 discloses a clamping chuck wherein several torque transmitting members surround a shaft having a hexagonal cross-sectional outline and the torque transmitting members are biased radially toward the shaft by suitable springs. If the torque transmitting members are rotated with reference to the shaft or vice versa, the shaft bears against V-shaped internal surfaces of the torque transmitting members and moves them apart (i.e., away from the axis of the shaft) so that the external surfaces of the torque transmitting members can bear against the internal surface of a tubular component which surrounds the clamping chuck.

German Auslegeschrift No. 22 11 518 discloses a modified clamping chuck which employs a shaft having a square cross-sectional outline. The external surface of the shaft bears against the internal surfaces of the torque transmitting members, either directly or through the medium of rolling elements, to move the torque transmitting members apart. Such members are urged toward the periphery of the shaft by ring-shaped springs.

German Pat. No. 1 119 301 discloses a further clamping chuck wherein a supporting stud has recesses for pivotable torque transmitting members. These members become erected in response to the application of torque and then bear against the internal surface of a sleeve which surrounds the patented chuck.

All of the above described conventional clamping chucks exhibit the drawback that their torque transmitting action is not reliable, particularly that the torque receiving part which surrounds the torque transmitting members can be disengaged from these members in response to the application of shocks and vibrations which develop in actual use of the chuck. In other words, even minor stray movements can result in a termination of torque transmission between the internal surface of the tubular component and the external surfaces of the torque transmitting members. The main reason for such lack of reliability of the torque transmitting connection is believed to be that the extent of angular displacement of the tubular component relative to the torque transmitting members in order to establish a torque transmitting engagement between such parts is rather small. In other words, even a relatively small angular displacement of the aforementioned shafts with reference to the surrounding torque transmitting members suffices to bring about a pronounced radial displacement of the torque transmitting members which might be desirable and advantageous for rapid establishment of the torque transmitting connection but is a drawback when a relatively small angular displacement of the shaft in the opposite direction entails a termination of transmission of torque.

OBJECTS AND SUMMARY OF THE INVENTION

An object of the invention is to provide a torque transmitting device which overcomes the aforediscussed drawbacks of conventional clamping chucks and can be put to use under circumstances when its parts and/or the driven part or parts are likely or expected to perform some stray movements.

Another object of the invention is to provide novel and improved means for moving the torque transmitting members relative to the axis of the part or parts which drive the device in actual use.

A further object of the invention is to provide a torque transmitting device which can be used with particular advantage to transmit torque from a rotor to an annular component, such as the core of a bobbin or the like.

An additional object of the invention is to provide a device which can be put to use for transmission of torque regardless of whether the driven part must be rotated in a clockwise or in a counterclockwise direction.

Still another object of the invention is to provide a device which can be used to reliably couple a bobbin or the like to a drive shaft or another rotor with a force which increases in response to increasing resistance of the driven part to rotation with the driving part.

A further object of the invention is to provide a novel and improved rotor for use in the above outlined torque transmitting device.

An additional object of the invention is to provide novel and improved torque transmitting members for use in the above outlined device.

The invention is embodied in a self-locking device for transmitting torque to the internal surface of a tubular component, such as the hollow core of a bobbin. The device comprises a rotor which is provided with external threads, and first and second nuts which are provided with internal threads in mesh with the external threads. The threads are such that joint rotation of the nuts relative to the rotor and/or vice versa in a selected direction entails an axial movement of the nuts relative to each other. The device further comprises torque transmitting means including at least two torque transmitting members which are outwardly adjacent the nuts and have external surfaces engageable with the internal surface of the tubular component and inner sides which face the outer sides of the nuts. The inner sides of the torque transmitting members and the outer sides of the nuts are provided with cooperating cam faces which serve to move the torque transmitting members substantially radially outwardly and away from the rotor in response to rotation of the nuts in the selected direction so that the external surfaces of the torque transmitting members bear against the internal surface of the tubular component. The device also comprises means for biasing the torque transmitting members substantially radially inwardly toward the rotor.

Each of the nuts can be provided with an external protuberance for each torque transmitting member, and each torque transmitting member is then provided with an internal groove for the respective protuberances of the nuts. The aforementioned cam faces are provided on the protuberances and in the grooves. Furthermore, each torque transmitting member can be provided with a pair of internal projections, one for each nut, and each projection is provided with at least one cam face. The nuts have sockets for the respective projections, and at least one cam face in each socket. The sockets can be provided in the aforementioned protuberances and the projections can be provided in the aforementioned grooves.

In accordance with a presently preferred embodiment of the torque transmitting device, each socket has two mutually inclined cam faces and each projection has two mutually inclined cam faces cooperating with the cam faces in the respective socket to move the torque transmitting members substantially radially and away from the rotor in response to rotation of the nuts in either direction starting from a neutral position in which the nuts are located at a predetermined axial distance from each other.

The cam faces preferably make acute angles with the axis of the rotor and the rotor can include first and second sections which respectively have left-hand and right-hand threads and mate with the first and second nuts, respectively, so that the nuts move apart when they are jointly rotated in a first direction and move nearer to each other when they are jointly rotated in the opposite direction.

The nuts can be rotated by the internal surface of the tubular component through the medium of the torque transmitting members, and the torque transmitting means can comprise three or more preferably equidistant torque transmitting members (as seen in the circumferential direction of the rotor).

The biasing means can comprise one or more ring-shaped springs which are recessed into the torque transmitting members.

The torque transmitting device can further comprise means for braking the rotor.

Instead of having two sections with left-hand and right-hand threads, respectively, the rotor can be provided with a first section having threads of a first pitch and a second section having threads of a different second pitch.

The novel features which are considered as characteristic of the invention are set forth in particular in the appended claims. The improved torque transmitting device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
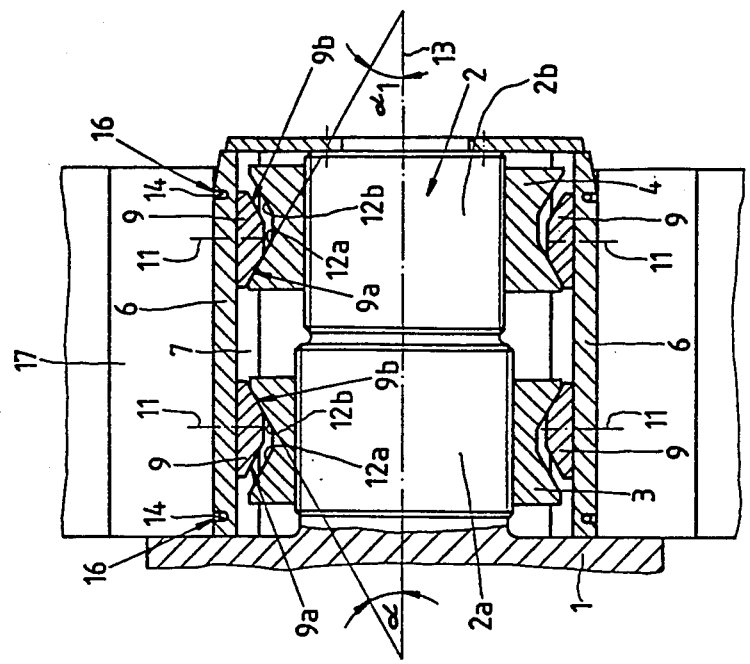
FIG. 1 is an axial sectional view of a torque transmitting device which embodies the invention and whose torque transmitting members are disengaged from the core of the bobbin, the section being taken in the direction of arrows as seen from the line A—A of FIG. 3.
Figure 2:
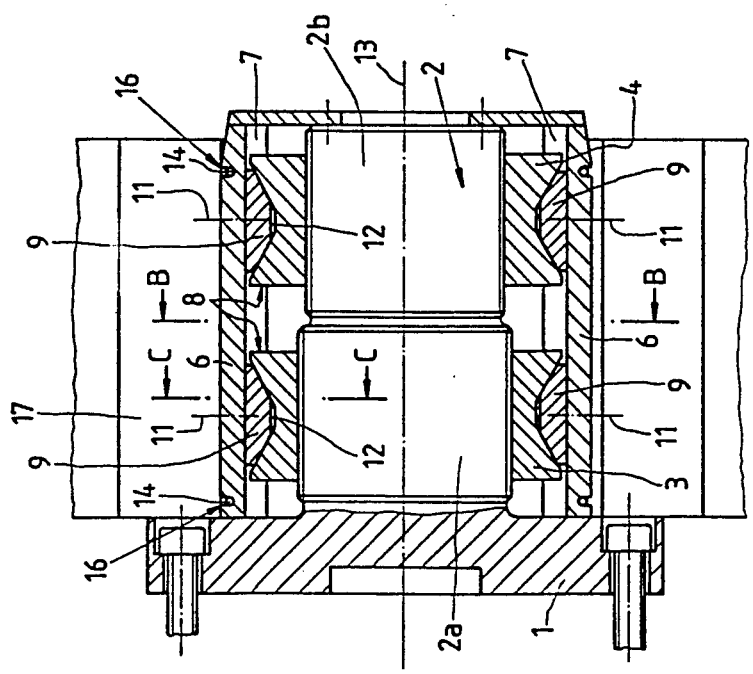
FIG. 2 shows the device of FIG. 1 in operative position in which the bobbin is compelled to share all angular movements of the rotor.
Figure 4:
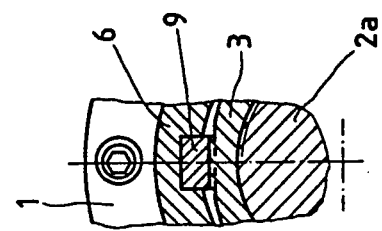
FIG. 4 is a fragmentary sectional view as seen in the direction of arrows from the line C—C of FIG. 1.
Figure 3:
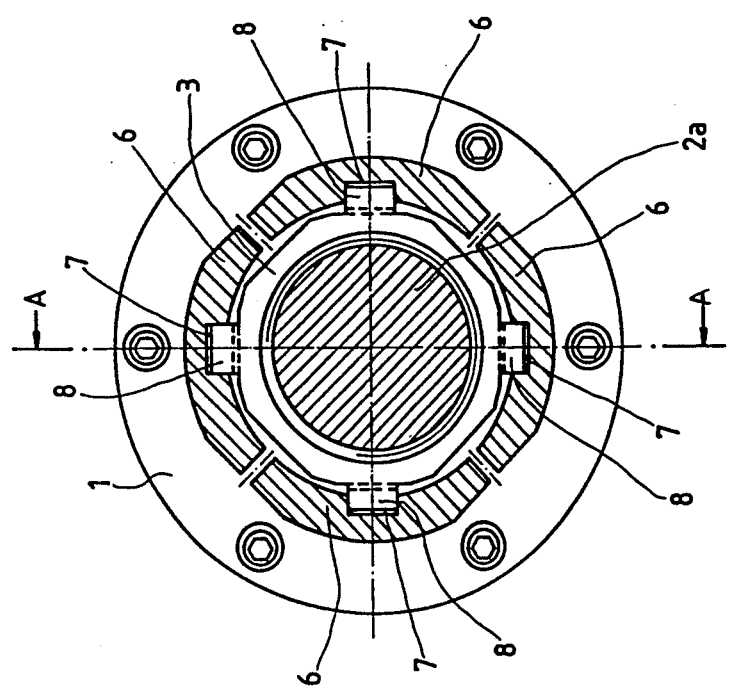
FIG. 3 is a sectional view as seen in the direction of arrows from the line B—B of FIG. 1.

The improved torque transmitting device comprises a rotor 2 (e.g., a cylindrical shaft) which is integrally or separably connected to a flange 1. The latter can be said to constitute a means for braking as well as a means for rotating the shaft 2. The flange 1 can be affixed to a main drive shaft, to the output element of a motor or to any other part which is to drive a tubular component 17 (e.g., the core of a bobbin) when the improved device is in actual use. In the embodiment which is shown in FIGS. 1 to 4, the rotor 2 has a first cylindrical section 2a which is provided with left-hand threads and a second cylindrical section 2b which is provided with right-hand threads (or vice versa). The external threads of the section 2a mesh with the internal threads of a first nut 3, and the external threads of the section 2b mate with the internal threads of a second nut 4. Therefore, the nuts 3, 4 move axially toward each other if they are jointly rotated relative to the rotor 2 in a first direction, and the nuts move axially away from each other if they are jointly rotated in a second direction counter to the first direction (while the rotor 2 is braked by the flange 1). FIG. 1 shows the nuts 3 and 4 in neutral positions at a predetermined axial distance from each other; the improved torque transmitting device is then idle, i.e., the tubular component 17 can be slipped off the set of four axially parallel torque transmitting members 6 which surround the nuts 3 and 4. FIG. 2 shows the nuts 3, 4 in positions at a greater axial distance from each other than in the neutral positions of FIG. 1. If the direction of rotation of the nuts 3, 4 relative to the rotor 2 is reversed, the nuts are compelled to leave the neutral positions of FIG. 1 and to move nearer to each other.

The external surfaces of the torque transmitting members 6 are moved into torque transmitting engagement with the internal surface of the tubular component 17 in response to movement of the nuts 3, 4 from the neutral positions of FIG. 1 irrespective of whether the nuts are rotated clockwise or counterclockwise (while the rotor 2 is held against rotation with the nuts). The means for effecting radial movements of the members 6 in response to joint rotation of the nuts 3 and 4 relative to the rotor 2 includes first cam faces 9a, 9b which are provided (directly or indirectly) on the members 6 and second cam faces 12a, 12b which are provided in or on the nuts 3 and 4. As shown, the inner side of each member 6 has a longitudinally extending groove 7 and the outer sides of the nuts 3 and 4 are provided with sets of four protuberances 8 each, one for each member 6. The protuberances 8 extend into the grooves 7 of the respective members 6 so that these members are compelled to share all angular movements of the nuts 3, 4 and that they compel the nuts to rotate as a unit.

Each torque transmitting member 6 comprises two internal projections 9 which are permanently or separably secured to its main portion. FIGS. 1 and 2 show schematically (by phantom lines 11) separable connections between the projections 9 and the respective members 6. Each projection 9 is provided in the deepmost or bottom part of the respective groove 7, and each such projection extends into a socket 12 which is provided in the respective protuberance 8 of the corresponding nut 3 or 4. The cam faces 9a, 9b are provided on the projections 9, and the cam faces 12a, 12b are provided in the sockets 12. Each cam face 9a cooperates with the adjacent cam face 12a, and each cam face 9b cooperates with the adjacent cam face 12b. The arrangement is such that the cam faces 12a in the sockets 12 of the nut 4 cooperate with the cam faces 9a of the respective projections 9 if the cam faces 12b in the sockets 12 of the nut 3 cooperate with the adjacent cam faces 9b of the respective projections 9, and that the cam faces 9a of the projections 9 in the sockets 12 of the nut 3 cooperate with the adjacent cam faces 12a if the cam faces 12b in the sockets 12 of the nut 4 cooperate with the adjacent cam faces 9b, depending upon the direction of axial movement of the nuts 3 and 4 from their neutral positions. The torque transmitting members 6 have peripheral recesses 16 for two ring-shaped springs 14 which constitute a means for yieldably biasing the members 6 substantially radially inwardly toward the axis of the rotor 2, i.e., for urging the projections 9 into the respective sockets 12 in the protuberances 8 of the nuts 3 and 4. The projections 9 constitute twin wedges which can move the respective torque transmitting members 6 away from the axis 13 of the rotor 2 in response to rotation of the nuts 3, 4 and members 6 in either direction, as long as the nuts move toward or away from the neutral positions of FIG. 1.

The cam faces 12b in the sockets 12 of the nut 4 make with the axis 13 of the rotor 2 an acute angle $\alpha$, and the cam faces 12a in the sockets 12 of the nut 4 make with the axis 13 an acute angle $\alpha$. The angle $\alpha_1$ equal or approximate the angle $\alpha$. The inclination of internal cam faces 9a, 9b on the projections 9 of the member 6 can be identical with that of the adjacent complementary cam faces 12a, 12b in the corresponding sockets 12. All that counts is to ensure that the members 6 are compelled to move radially outwardly when the distance between the nuts 3 and 4 is increased beyond that which is shown in FIG. 1 (see FIG. 2) or is reduced to less than the predetermined distance shown in FIG. 1.

The surfaces bounding the grooves 7 of the torque transmitting members 6 cooperate with the protuberances 8 of the nuts 3, 4 to ensure that the nuts rotate as a unit and also that the members 6 can rotate the nuts in response to reception of torque from the internal surface of the component 17 when the latter is to be coupled to the rotor 2. As mentioned above, the projections 9 of the torque transmitting members 6 act not unlike spreaders in that they cooperate with the cam faces 12a, 12b in the respective sockets 12 to ensure that the members 6 are compelled to move radially outwardly as soon as the nuts 3, 4 are caused to move toward each other or away from each other, starting from the neutral positions which are shown in FIG. 1.

The mode of operation is as follows:

If the tubular component 17 is to be coupled to the torque transmitting device, the flange 1 is used to brake the rotor 2 and the component 17, which rests by its own weight on the topmost member or members 6, is turned so as to rotate the members 6 and hence the nuts 3 and 4 about the axis 13, i.e., with reference to the rotor 2. Apparatus which employ the improved torque transmitting device are invariably equipped with brakes so that it is not necessary to provide a brake for the specific purpose of holding the rotor 2 against rotation during application of the tubular component 17, i.e., during the establishment of a torque transmitting connection between the external surfaces of the members 6 and the internal surface of the component 17.

As the members 6 rotate with the component 17 while the rotor 2 is braked, the members 6 automatically move radially outwardly against the opposition of the springs 14 because the cam faces 9b on the left-hand projections 9 of the members 6 slide along the respective cam faces 12b and the cam faces 9a on the right-hand projections 9 of the members 6 slide along the respective cam faces 12a (as shown in FIG. 2) so that the distance between the members 6 and the axis 13 increases. The nuts 3, 4 rotate relative to the rotor 2 and move apart (as seen in the axial direction of the rotor) so that the protuberances 8 of the nuts cooperate with the respective projections 9 in moving the members 6 apart against the opposition of the springs 14 and thereby move the external surfaces of the members 6 into pronounced friction engagement with the internal surface of the tubular component 17. The self-locking action of internal threads in the nuts 3, 4 and of the respective complementary threads on the rotor sections 2a, 2b suffices to ensure that the members 6 cannot automatically return to the positions of FIG. 1 under the action of the springs 14, i.e., the members 6 remain in torque transmitting engagement with the component 17 until and unless the component 17 is intentionally rotated in a direction to move the nuts 3 and 4 back to the neutral positions of FIG. 1 in which the springs 14 are free to maintain the majority of members 6 out of contact with the internal surface of the component 17. The members 6 not only bear against the internal surface of the component 17 but also center the component 17 on the rotor 2 so that the component 17 (and hence the entire bobbin) cannot rotate out of true.

If the component 17 is placed onto the topmost torque transmitting member 6 in a manner as shown in FIG. 1 (while the rotor 2 is braked and while the nuts 3 and 4 are held in their neutral positions at the predetermined axial distance from each other), the component 17 can be properly coupled to the improved torque transmitting device if it is turned in a direction to move the nuts 3 and 4 nearer to each other. The cam faces 9a of the left-hand projections 9 then cooperate with the cam faces 12a in the respective sockets 12 of the nut 3, and the cam faces 9b on the right-hand projections 9 then cooperate with the adjacent cam faces 12b in the respective sockets 12 to move the members 6 radially outwardly while the nuts 3 and 4 are caused to move nearer to each other. Such ability of the improved device to couple the component 17 to the members 6 regardless of the direction of rotation of the component in order to move the nuts 3 and 4 from the axial positions of FIG. 1 is particularly desirable and advantageous if a tubular component is to be mounted on two torque transmitting devices which are introduced into its interior from opposite axial ends. Heavier bobbins are or should be mounted on pairs of torque transmitting devices. In the absence of the provision of pairs of cam faces in each socket 12 and on each projection 9, the machine using rotary bobbins which are to be mounted on pairs of clamping chucks would have to be provided with a first chuck for one axial end of the bobbin and with a different second chuck for the other axial end of the bobbin. The same would hold true if a bobbin were to alternately rotate in a clockwise or in a counterclockwise direction.

An important advantage of the improved torque transmitting device is its reliability. Thus, vibrations which can develop when the device is in use are highly unlikely to loosen the torque transmitting connection between the members 6 and the internal surface of the tubular component 17. The pitch and the number of threads on the sections 2a, 2b of the rotor 2 can be readily selected with a view to prevent accidental loosening, i.e., the self-locking action of the threaded parts 2a, 2b and 3, 4 suffices to prevent accidental unwinding of the nuts, i.e., their return movement to the positions of FIG. 1 unless such return movement is desired by the operator.

The improved torque transmitting device can be modified in a number of ways without departing from the spirit of the invention. For example, the configuration of the projections 9 and protuberances 8 can be simplified if the device is to be designed for transmission of torque in a single direction. This will be appreciated by looking at FIG. 2 and by considering that the cam faces 9a, 12a in the left-hand portion and the cam faces 9b, 12b in the right-hand portion of the illustrated device can be omitted if the component 17 is to receive torque only while the nuts 3 and 4 are held at an axial distance from one another exceeding that distance at which the component 17 can be slipped on or off the annulus of torque transmitting members 6.

Furthermore, the sections 2a and 2b of the rotor 2 can be provided with threads which are inclined in the same direction but the pitch of threads on the section 2a is different from that of threads on the section 2b. This also results in a movement of the nuts 3, 4 toward each other in response to rotation in a first direction and away from each other in response to rotation in a second direction counter to the first direction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A self-locking device for transmitting torque to the internal surface of a tubular component, such as the hollow core of a bobbin, comprising a rotor having external threads; first and second nuts having internal threads mating with said external threads, said threads being such that joint rotation of said nuts with reference to said rotor in a selected direction entails an axial movement of said nuts relative to each other; torque transmitting means including at least two torque transmitting members outwardly adjacent said nuts and having external surfaces engageable with the internal surface of the tubular component and inner sides facing said nuts, said nuts having outer sides adjacent said inner sides and said inner and outer sides having cooperating cam faces arranged to move said members substantially radially outwardly and away from said rotor in response to rotation of said nuts in said selected direction so that the external surfaces of said members bear against the internal surface of the tubular component; and means for biasing said members substantially radially inwardly toward said rotor.

2. The device of claim 1, wherein each of said nuts comprises an external protuberance for each of said members and each of said members has internal grooves for the respective protuberances, said cam faces being provided on said protuberances and in said grooves.

3. The device of claim 1, wherein each of said members has a pair of internal projections, one for each of said nuts, and each of said projections has at least one cam face, each of said nuts having sockets for the respective projections and at least one cam face in each of said sockets.

4. The device of claim 3, wherein each of said nuts comprises an external protuberance for each of said members and said sockets are provided in said protuberances, each of said members having internal grooves for the respective protuberances and said projections being provided in the grooves of the respective members.

5. The device of claim 4, wherein each of said sockets has two mutually inclined cam faces and each of said projections has two mutually inclined cam faces cooperating with the cam faces in the respective sockets to move said members substantially radially and away from said rotor in response to rotation of said nuts in either direction starting from a neutral position in which said nuts are located at a predetermined axial distance from each other.

6. The device of claim 1, wherein said cam faces make acute angles with the axis of said rotor.

7. The device of claim 1, wherein said rotor includes first and second sections respectively having left-hand and right-hand threads and mating with said first and second nuts, respectively.

8. The device of claim 1, wherein said nuts are rotatable by the internal surface of the tubular component by way of said members and said torque transmitting means includes more than two torque transmitting members which are equidistant from one another in the circumferential direction of said rotor.

9. The device of claim 1, wherein said biasing means is recessed into said torque transmitting members.

10. The device of claim 1, further comprising means for braking said rotor.

11. The device of claim 1, wherein the external threads of said rotor include a first set having a first pitch and a second set having a different second pitch.

* * * * *